(12) United States Patent
Karon et al.

(10) Patent No.: US 12,106,014 B2
(45) Date of Patent: Oct. 1, 2024

(54) LOCALIZATION USING GRID-BASED REPRESENTATION OF MAP CONTRAINTS

(71) Applicants: Joshua Karon, Toronto (CA); Ahmed Mahmood, Milton (CA); Sean Huberman, Guelph (CA)

(72) Inventors: Joshua Karon, Toronto (CA); Ahmed Mahmood, Milton (CA); Sean Huberman, Guelph (CA)

(73) Assignee: MAPSTED CORP., Oakville (CA)

( * ) Notice: Subject to any disclaimer, the term of this patent is extended or adjusted under 35 U.S.C. 154(b) by 643 days.

(21) Appl. No.: 17/134,227

(22) Filed: Dec. 25, 2020

(65) Prior Publication Data

US 2022/0207201 A1    Jun. 30, 2022

(51) Int. Cl.
*G06F 30/13* (2020.01)
*G01C 21/00* (2006.01)
*G06F 111/04* (2020.01)
*G06F 111/08* (2020.01)

(52) U.S. Cl.
CPC ......... *G06F 30/13* (2020.01); *G01C 21/3878* (2020.08); *G01C 21/3881* (2020.08); *G06F 2111/04* (2020.01); *G06F 2111/08* (2020.01)

(58) Field of Classification Search
CPC .. G06F 30/13; G06F 2111/04; G06F 2111/08; G01C 21/3878; G01C 21/3881
USPC .......................................................... 703/1
See application file for complete search history.

(56) References Cited

U.S. PATENT DOCUMENTS

| | | | |
|---|---|---|---|
| 10,142,777 B1* | 11/2018 | Wulff | H04W 4/021 |
| 11,037,320 B1* | 6/2021 | Ebrahimi Afrouzi | G06T 7/521 |
| 2011/0064312 A1* | 3/2011 | Janky | G06F 18/00 |
| | | | 382/195 |
| 2021/0243564 A1* | 8/2021 | Hollar | G01S 5/0278 |

FOREIGN PATENT DOCUMENTS

WO    WO-2014016602 A1 *   1/2014   ........... G01C 21/206

OTHER PUBLICATIONS

H3_2018 (H3: Uber's Hexagonal Hierarchical Spatial Index Jun. 27, 2018). (Year: 2018).*

* cited by examiner

*Primary Examiner* — Brian S Cook

(57) ABSTRACT

A method and a device for localization using grid-based localization of map constraints are described. In an example, an indoor space is divided into a grid of tessellated polygonal tiles in a hierarchical structure. The grid is correlated with physical entities in the indoor space by associating each physical entity with a polygonal tile. Further, an absolute probability value indicative of presence of a device therein is associated with each polygonal tile. As part of associating, the absolute probability value is allocated to each polygonal tile in each hierarchical level to create a probability map for the indoor space. The probability map is used to generate a grid map for the indoor space and the grid map is usable to determine location of the device in the indoor space.

20 Claims, 6 Drawing Sheets

400

---

DIVIDE AN INDOOR SPACE INTO A GRID OF TESSELLATED POLYGONAL TILES IN A HIERARCHICAL STRUCTURE, EACH POLYGONAL TILE AT A LEVEL IN THE HIERARCHICAL STRUCTURE BEING SUBSTANTIALLY REPRESENATBLE BY POLYGONAL TILES IN OTHER LEVELS IN THE HIERARCHICAL STRUCTURE
410

↓

CORRELATE THE GRID WITH PHYSICAL ENTITIES IN THE INDOOR SPACE BY ASSOCIATING EACH PHYSICAL ENTITY WITH THE POLYGONAL TILE
420

↓

ASSOCIATE WITH EACH POLYGONAL TILE AN ABSOLUTE PROBABILITY VALUE OF PRESENT OF A DEVICE THEREIN, AND ALLOCATING THE ABSOLUTE PROBABILITY VALUE WITH EACH POLYGONAL TILE IN EACH HIERARCHICAL LEVEL IN THE GRID TO CREATE A PROBABILITY MAP FOR THE INDOOR SPACE
430

↓

GENERATE A FLOOR PLAN FOR THE INDOOR SPACE BASED ON THE PROBABILITY MAP, THE FLOOR PLAN USABLE FOR TO LOCALIZATION
440

FIG. 4

LOCALIZATION USING GRID-BASED REPRESENTATION OF MAP CONTRAINTS

TECHNICAL FIELD

The disclosure herein relates to the field of indoor navigation based localization of devices.

BACKGROUND

Location-based services are rapidly expanding as a ubiquitous service proposition. Outdoor location technologies are mainly based on GPS (Global Positioning System) technologies. At the same time, users of mobile devices have started to increasingly use and depend on indoor positioning and navigation applications and features. Particularly, indoor positioning and navigation of a mobile device carried or worn by a user can be difficult to achieve using satellite-based navigation systems, such as GPS, because the satellite-based navigation technology generally relies on the line-of-sight between the mobile device and the satellite. Accordingly, when the connection between the two becomes unavailable, or is only sporadically available, such as within enclosed, or partially enclosed, urban infrastructure and buildings, including hospitals, shopping malls, airports, university campuses and industrial warehouses, the positioning and navigational capability of the satellite-based navigation system becomes unreliable. In turn, indoor navigation and positioning solutions may rely on various sensors including accelerometers, gyroscopes, and magnetometers that may be commonly included in mobile phones and other computing devices, in conjunction with acquired wireless communication signal data to localize the mobile device. Thus, effectiveness of the indoor navigation and positioning solution is directly dependent on the quality of data, sensor or signal, and the manner of utilization of data for localization.

BRIEF DESCRIPTION OF THE DRAWINGS

FIG. 4 illustrates, as an example, a method of localization of mobile devices in an indoor space using grid-based representation of map constraints.

DETAILED DESCRIPTION

Figure 1:
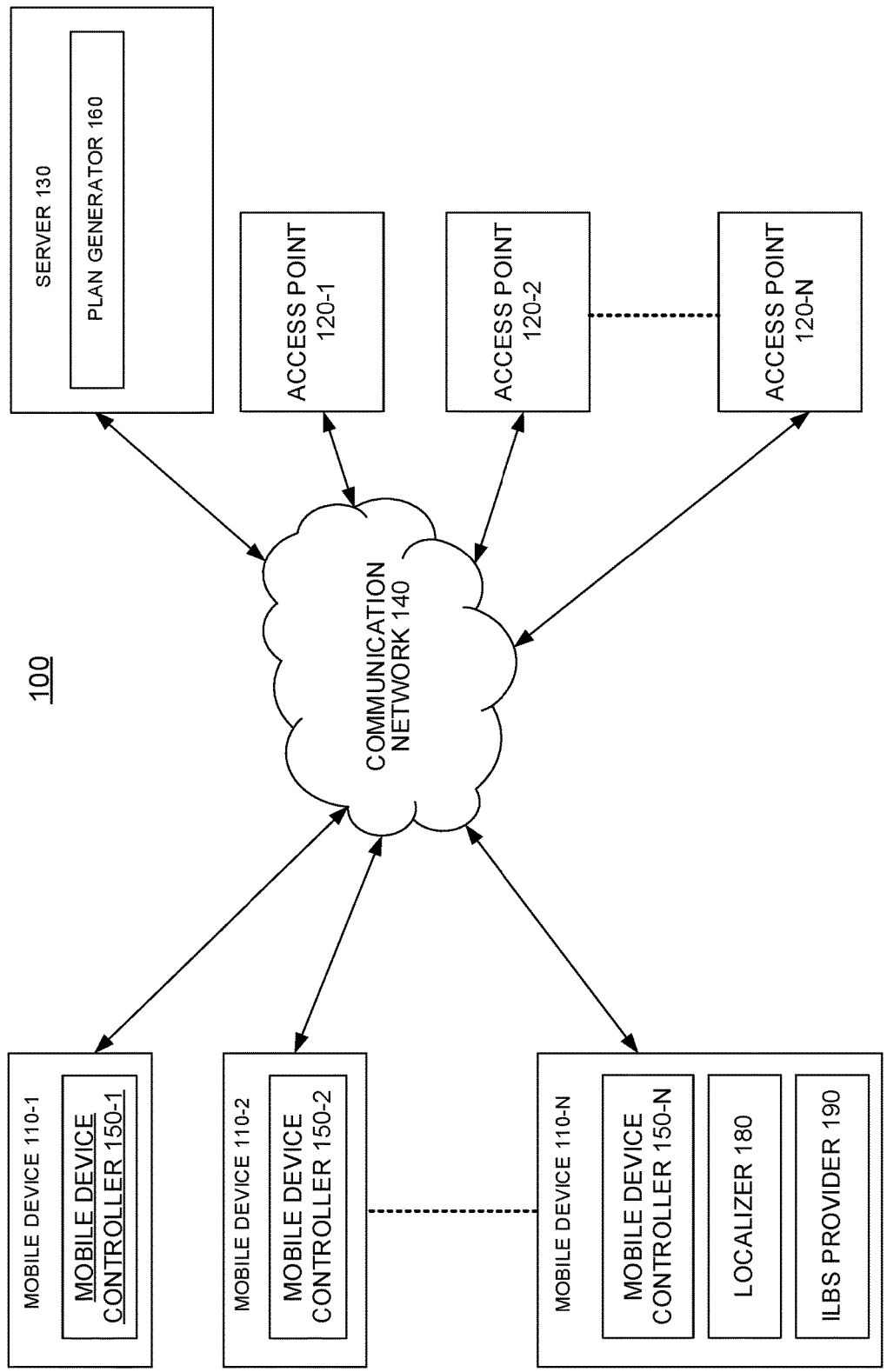
FIG. 1 illustrates, as an example, a network environment for localizing mobile devices in an indoor space using grid-based representation of map constraints.

Among other benefits and technical effects, embodiments provided herein provide for efficiently, effectively, and accurately providing indoor-location based services to mobile devices in an indoor space. According to an aspect, the present subject matter involves a tessellated, hierarchical grid in which its individual components are interlinked with each other at different hierarchical levels. The tessellation or tiled structure of the grid as well as the interlinked hierarchical structure allows for representing the indoor space in an effective and true manner, and at the same time, allows for indexing the spatial data associated with the indoor space in a manner that the information is easily and efficiently retrievable. As used in the present context, as an example only, the spatial data can be understood as the data which can identify the geolocation of a region or a physical entity in the indoor space, and the correlation of such geolocation with one or more tiles and one or more levels in the hierarchical grid.

Generally, large indoor spaces, such as shopping malls, airports, parking garages, and warehouses, that attract significant user traffic also seek to host a wide set of services that may be of interest to a user. Such services may often be specifically curated for a user based directly on a location of the mobile device of the user. For instance, an effective indoor location-based services (ILBS) system is able to generate suggestions of services and locations to the user by initiating a quick search in the vicinity of a user's location indicated by the user's mobile device. In few other instances, the ILBS systems may further allow a user to search for services or amenities and pin them as potential points-of-interest (POIs). At the same time, the ILBS systems may even offer efficient routing or navigation, coupled with user-friendly navigation, to reach a user-selected destination. Therefore, such indoor-location based services, given their application, form an obvious integration option for indoor positioning systems (IPSs) that seek to accurately localize or locate mobile devices in such indoor spaces. In other words, a natural application of IPSs lies in offering indoor location-based services.

In addition, recent technological advancements which allow the universally available smart mobile devices packing a variety of sensors for gathering data that is usable for positioning, has extended the reach of IPS as well as ILBS. Typically, the IPS uses spatial data generated by such mobile devices in the indoor location to execute efficient and effective localization. The spatial data can be linked to entities in a floor plan, and the entities are, in turn, georeferenced, thereby facilitating localization. In view of the enormous amount of spatial data that must be parsed by the IPS, the manner in which the spatial data is representative of the indoor space and the ease of access and use of the spatial data is of particular relevance to the IPSs. Both, the representation of the indoor space by the spatial data as well as the ease of access of the spatial data, may be governed by the technique of spatial indexing implemented by the IPS. In turn, therefore, the spatial indexing may have a direct bearing on the effectiveness and the efficiency of the IPS, which may be of particular relevance if the IPS is to offer time-sensitive services, such as navigation.

In addition to the above, localization in the indoor space is enabled by fusion of many data sources, such as sensors, that indicate the users position within an indoor space. The data sources can be split into two categories, namely, relative indicators of location and absolute indicators of location. For example, global positioning system (GPS) and Wi-Fi-based sources are considered absolute sources of data because the mobile device's location can be directly inferred in relation to the GPS satellite or the WIFI access point. On the other hand, data sources, such as barometer measurements and inertial measurements, are relative indicators of location because such readings can indicate that a user has moved in a certain direction. Such data is only useful if the location of user is known before movement.

Especially for indoor localization which uses mobile devices, both absolute and relative data sources play key role in localisation. The absolute data sources are needed to initialize the mobile device's location, even though these data sources may not provide a high level of accuracy in localizing. In contrast, while the relative data sources provided by a mobile device may not be in isolation usable to infer the mobile device's location directly, when used with the absolute sources, they provide high accuracy in localizing the mobile devices. Therefore, although inertial measurements themselves are only a relative data source, when combined with a-priori knowledge of the physical limitations of an indoor space, they can be transformed into an absolute data source. For example, if a mobile device makes a particular series of movements which is such a combination which can only fit in one area of the floor plan due to the physical structure of the building, then the mobile device's location can be inferred from such information.

In addition, the indoor space is represented in respect to the possible areas where a mobile device may be present, referred to as map constraints. As mentioned earlier, although inertial measurement data provide more accurate localization than other data sources, they still contain noise and errors. By fusing inertial measurements and map constraints, considerable errors in the inertial data can be filtered out. For example, if the inertial sensors detect a right turn, but the map constraints indicate that a right turn at the current estimated position of the user is not possible due to a wall or any other obstacle, then the right turn from the inertial data can be considered to be a false positive and discarded. Therefore, the accuracy of IPSs can be considerably high when the inertial measurements are fused with the map constraints.

Conventionally, in one of the approaches, the map constraints represent the indoor space as a connected network of linear walking paths that may be traversed by the user of the mobile device and are indicative of the possible locations of the mobile device in the indoor space, and are based on the assumption that the mobile device's user's motion is restricted to those pathways. Such representation of the map constraints may adequately represent passageways and pathways, and the impossible entities, for instance, by representing a path that considers a wall through which the user cannot walk. In addition, such a representation may be computationally viable owing to the limited number of possible discreet paths that represent the entire indoor space. However, such a representation may oversimplify the actual indoor space, especially in representing broad passageways or open areas of the indoor space. This is because the movement of the user in such areas is not restricted to the linear walking paths which are used to represent the area. In other words, the use of the conventional map constraints may be an inadequate representation and, in some cases, may be a misrepresentation of the indoor space.

Such an inadequate representation or misrepresentation may lead to poor localization performance in the indoor space, especially in the spaces which are not adequately represented by the map constraints. In addition, even in areas which are adequately represented, such as in narrow hallways, if the user of the mobile device does not exhibit the expected pattern while walking, for example, in if the user exhibits a zig-zag walking pattern in the hallway, then the IPS may not be able to illicit a correct position from that data as that would not be represented well by the conventional map constraints In addition, in such a manner of representation of the indoor space by the corresponding spatial data and the indexing thereof, the localization capability may be limited and the localization may always be a trade-off between efficiency/speed and accuracy. For instance, for an accurate measurement, a large region of the indoor space may have to be considered to increase the probability of locating the mobile device therein, which can involve considerably large amount of spatial data to be accessed and processed leading to a slow rate of localization and, therefore, ineffectiveness in providing the indoor location-based services.

Examples of the present subject matter are described herein which seek to address, inter alia, the above outlined deficiencies. The present subject matter discloses a manner by which optimal indoor localization, for example, accurate as well as computationally light, is achieved which can facilitate rendering of efficient as well as accurate and effective indoor location-based services. According to an aspect, the present subject matter involves the use of a multi-layered, hierarchical grid made of polygons that cover the floor plan of the indoor space. The indoor space can be divided into a grid of polygonal tiles abutting adjacent polygonal tiles, i.e., having a tessellated structure. In addition, the polygonal tiles can also be provided in a hierarchical structure, such that a polygonal tile higher in the hierarchical structure substantially covers two or more smaller polygonal tiles lower in the hierarchical structure. The physical entities in the indoor space can be georeferenced and then cross-referenced with the polygonal tiles to correlate the georeference of each physical entity with the corresponding polygonal tile in each hierarchical level. The georeference may be any information which can be used to indicate the location of the physical entity. In one example, as part of georeferencing, global or absolute coordinates are used to indicate the location of the physical entities. In other examples, a local coordinate system, for instance, associated with the indoor space, may be used for georeferencing the physical entities. In addition, polygonal tiles at lower levels in the hierarchical structure, such polygonal tiles referred to as child tiles, can be hierarchically linked to one or more polygonal tile at a higher level in the hierarchical structure, such polygonal tiles referred to as parent tiles.

Further, an absolute probability value can be associated with each of polygonal tile in the grid, indicating the possibility of the presence of a mobile device therein. In an example, the absolute probability value associated with the polygonal tile can be based on a physical entity correlated to the polygonal tile, i.e., the correlation may indicate presence of the physical entity in that polygonal tile which may have a direct bearing on the absolute probability value linked with the polygonal tile, as the presence of the physical entity may determine the behavior of the user of the mobile device in that polygonal tile. In other words, whether or not a mobile device can be found to be present in a polygonal tile or not depends on the constitution of the polygonal tile in terms of the physical entities contained therein. In addition, a probability map can be created for the indoor space which can indicate the absolute probability values allocated to each polygonal tile in the entire grid and its various hierarchical levels. Based on the probability map, a grid map indicative of the grid-based map constraints can be generated for the indoor space which can be further used for localizing the mobile device. As an example, the grid map can be a representation of the indoor space, for instance, of the floor plan of the indoor space, in terms of the hierarchically arranged polygonal tiles forming the tessellated grid structure as well as indicative of the various map constraints in the floor plan along with the tessellated grid structure.

Not only is the use of such a grid map computationally viable, the grid-based representation of the map constraints can improve system scalability. For instance, different indoor spaces may have different sizes as well as different amount of crowding or physical entities. The grid-based representation of the map constraints, also referred to as the grid-based map constraints, can be used to easily customize the grid map to represent any indoor space at any resolution, i.e., selecting the granularity of distribution of the absolute probability value in the indoor space. For example, in a case where the indoor space is crowded, a higher resolution of the grid can be selected in order to accommodate the detail, whereas if the indoor space is scantily filled then a lower resolution of the grid can be selected to decrease the memory footprint of the grid map. Further, as mentioned previously, conventionally, the map constrains can be represented by line segments for walls which may cause the processing for localization to be computationally intensive, for instance, to calculate if a wall has been intersected or not. On the other hand, the grid-based representation of the map constraints is not only computationally less intensive, it can also represent the position as a probability value between 0 and 1, i.e., with a level of uncertainty that the line segment-based representations may be unable to. In other words, while the line segment-based representation indicates the probabilities as 0 and 1, i.e., whether the user path either intersects a wall or it does not, the grid-based approach of the present subject matter allows assignment of intermediate probabilities. For instance, the present subject matter allows assignment of a probability of 0.25 or 0.3 to regions of the indoor space in which the user may be present but it is unlikely.

The polygonal tiles used for creating the grid may have various shapes and may be such that the polygonal tiles, when abutting together, can substantially fill the indoor space. In one example, the polygonal tiles may have a symmetrical polygonal shape, such as a symmetrical hexagonal shape. In another example, the polygonal tiles may have the same asymmetrical shape or have different symmetrical shapes. In yet another example, the polygonal tiles may be made of two or more different symmetrical shapes, in the same hierarchical level. In one more example, the polygonal tiles may be made of two or more different symmetrical shapes in different hierarchical levels. For instance, one hierarchical level can include a first set of polygonal tiles that are of a first symmetrical shape and another hierarchical level can include a second set of polygonal tiles that are of a symmetrical second shape, and a number of polygonal tiles in the lower hierarchical level are substantially contained in or cover a single polygonal tile of the set in the higher hierarchical level. For instance, the second set of tiles in the lower hierarchical level can be triangular tiles whereas the first set of tiles in the higher hierarchical level be hexagonal or rhombus-shaped. In addition, in the same example, in case the tiles in the lower hierarchical level are triangular, and the ones in the higher hierarchical level are rhombus-shaped, there may be a still higher hierarchical level which may have hexagonal tiles substantially containing within it the rhombus-shaped tiles as well as the triangular tiles of the lower hierarchical levels. Such interlinking of the polygonal tiles in different hierarchical levels can vastly enhance the flexibility with which the spatial indexing can be used in the present subject matter. For example, such a hierarchical structure can be embodied as a tree (or a tree-like) data structure, which kind of indexing of the data allows for an effective manner of retrieval of the information from a particularly large collection of data such as that used for localization.

In said examples, the polygonal tiles so tessellated can allow for effective operation in respect to the spatial indexing. The tessellation of the tiles can offer a dense packing for any lattice at any given hierarchical level. Therefore, from a localization perspective, such a polygonal tiling can provide a high degree of quantization for a given hierarchical level and a given area of the indoor space. In addition, the packing the polygonal tiles at each level is done in such a manner that no regions in the indoor space remain unmapped against the grid and, therefore, the effectiveness of the grid for localization is substantially high. Further, the tiles may also be used in a manner that the centroids of all the adjacent polygonal tiles are equidistant and, therefore, this may allow for smooth transitions between the polygonal tiles in all directions in an orderly manner.

Although the hierarchical structure, as envisaged by the present subject matter, has been described with the polygons higher in the hierarchy having a bigger size and smaller-sized polygonal tiles at lower levels of the hierarchy, any other manner of correlating the shapes and sizes of the polygonal tiles in the multiple layers may be implemented. For example, the hierarchy may be inverted and, instead, a larger polygonal tile may be lower in the hierarchy with respect to the smaller polygonal tiles.

Also provided herein is a computing device including a processor and a memory. In both, the instructions are executable in the processor to render indoor-location based services as described above.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame. In other examples, other forms of coordinates, such as spherical coordinates or polar coordinates may be used for spatially indicating the locations, as envisaged in the present subject matter.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable mobile devices, and tablet mobile devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage mobile devices, such as hard drives on personal computers or servers. Other examples of computer storage mediums include portable memory storage units, flash memory (such as carried on smartphones, multifunctional mobile devices or tablets), and magnetic memory. Computers, terminals, network enabled mobile devices (e.g., mobile devices, such as cell phones) are all examples of machines and mobile devices that utilize processors, memory, and instructions stored on computer-readable mediums. Additionally, embodiments may be implemented in the form of computer-programs, or a computer usable carrier medium capable of carrying such a program.

System Description

FIG. 1 illustrates, in an example embodiment, a network environment 100 for localization of mobile devices 110-1, 110-2, . . . 110-N in an indoor space using grid-based representation of map constraints. The indoor space may include airports, malls, parking garages, warehouses, and any similar indoor facility. The mobile devices 110-1, 110-2, . . . 110-N may be collectively referred to as mobile devices 110 and individually as mobile device 110. The mobile device 110 and a server computing device 130 may communicate over a communication network 140.

The communication network 140, in an example, may be a wireless communication network, such as, a telecommunication network, a cellular network, a wireless local area network (WLAN), a satellite communication-based network, a near field communication-based network, etc.

The server computing device 130, interchangeably referred to as server 130, may be a computing device, such as a cloud server or a remote server. The network environment 100 may, as an option, include access points 120-1, 120-2, . . . 120-N, collectively referred to as access points 120 and individually referred to as access point 120, that may be connected to the mobile device 110 and the server computing device 130 over the communication network 140. The access points 120 may be a computing device, which may provide for various mobile devices to connect to a network, such as a wired network of the communication network 140. The access points 120 may be spread across the indoor space to ensure that the indoor space is appropriately covered. In another example, the mobile device 110 may directly communicate with the server computing device 130 via the communication network 140.

In operation, the server 130 can facilitate in the localization of the mobile device 110 based on, for example, a dynamically selectable level of granularity in a grid-based representation of the indoor space. Particularly, in such a grid-based representation, the map constraints are represented in a tessellated, hierarchical grid structure, and the representation is referred to as a representation of the indoor space using grid-based map constraints. For the purposes, the server 130 can include plan generator 160. In an example, a mobile device controller 150 of the mobile device 110 may periodically or on receiving an input from the server computing device 130, hereinafter server 130, transmit corresponding localization data packet to the server 130. The localization data, among other things, may include localization data. The localization data may include location details, such as location coordinates in the pedestrian area or device data (signal and/or sensor) used for localization and/or location (x, y) coordinate information and floor number information, such as for a multi-floor building constituting the pedestrian area. Further, the localization data may also include a confidence level associated with the estimated location of the mobile device. In an example, the localization data packet may further be partitioned to include a preamble component having a company identifier or other identifier associated with either a proprietary or a standard formatting of the localization data packet, based upon which, for example, the information encoded in localization data packet may be correctly decoded into specific (x, y, z) coordinates to establish a position of mobile device 110 as localized within the pedestrian area. The position of the mobile device 110, i.e., localization, may be estimated either by the mobile device 110 itself, for instance, by the mobile device controller 150. In other examples, other forms of coordinates, such as spherical coordinates or polar coordinates may be used for spatially indicating the locations, as envisaged in the present subject matter.

In one embodiment, the mobile device 110 may cooperate with the server 130 and carry out localization of the mobile device 110, i.e., itself, by selecting a level of granularity of representation of the indoor space. The mobile device 110 may be a cellular or smartphone, a laptop or a tablet computer, or a wearable computer mobile device that may be operational for any one or more of telephony, data communication, and data computing. As mentioned above, the mobile device 110 may include fingerprint data of the indoor space, such as an indoor facility and proximate pedestrian section stored in a local memory. In some examples, the mobile device 110, may download the fingerprint data from the server computing device 130, which may make the fingerprint data accessible to the mobile device 110 for download into the local memory of mobile device 110. The fingerprint data along with mobile device data (sensor data and/or signal data) obtained by the mobile device 110 may be used for localization.

The mobile device 110 may include sensor functionality by way of sensor mobile devices. The sensor mobile devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. In another example, the server 130 may have the location determination capability and a communication interface for communicatively coupling to communication network 140. In an example, a localizer 180 of the mobile device 110 may, periodically or on receiving an input from the server computing device 130, localize the mobile device 110, and the indoor location-based service (ILBS) provider 190 can render location-based services to the mobile device 110.

The localizer 180, constituted of logic instructions executable in a processor of the mobile device 110 in one embodiment, may be hosted at the mobile device 110 and provides, at least in part, capability for system localizing the mobile device 110 along a pedestrian route traversed in an indoor space. In alternate embodiments, one or more portions constituting the localizer 180 may be hosted remotely at a server device, such as the server 130, and made communicatively accessible to mobile device 110 via communication network 140. Similarly, the plan generator 160, constituted of logic instructions executable in a processor of the server 130, may in other embodiments be partially or completely hosted in the mobile device 110.

Thus, the provision of dynamically selectable level of granularity of indoor space representation as well as the selection of the granularity, on-the-fly or otherwise, for may be done by the mobile device 110 entirely or by the server 130 entirely, or, as explained above, partly by the mobile device 110 and partly by the server 130.

In operation, the localization based on the dynamically selectable level of granularity may be performed two phases. The first phase is referred to as a preparatory phase in which the server 130 prepares for allowing the representation of the indoor space being such that its level of granularity is selectable, and the second phase is referred to as an executory phase in which the mobile device 110 (or the server 130, collectively referred to as computing device) performs the localization based on a selected level of granularity. As mentioned above, in other examples, the preparatory phase as well as the executory phase may be performed by a single mobile device, i.e., either the mobile device 110 or the server 130.

In the preparatory phase, plan generator 160 can prepare a grid map of the indoor space, which can be then used for providing indoor location-based services to the mobile device 110. Accordingly, the plan generator 160 can identify various physical entities that are present in the indoor space. The physical entities can include, for example, walls, passages, hallways, elevator shafts, escalators, open spaces, doorways, hallway, kiosks, stores, alleys, holes, café, and salon. In other words, the physical entities can be any meaningful label that can be associated with the polygonal tile by way of the correlation therebetween. In addition, the plan generator 160 can also identify the local or global position of the physical entities using a coordinate system, and is referred to as georeferencing the physical entities in the indoor space. As mentioned earlier, as an example, the global or local location is used to indicate the location as determined on the basis of a global or local coordinate system. In said example, the georeference can be any information which can be used to determine the location of the physical entity.

Subsequently, the plan generator 160 can divide the indoor space into a grid of tessellated polygonal tiles, i.e., polygonal tiles abutting adjacent polygonal tiles. In addition, plan generator 160 can generate the grid as a multi-layered, hierarchical structure of such polygonal tiles, where the polygonal tiles in each level or layer of the hierarchical structure bear a relationship with the polygonal tiles in the level above and below that level. Accordingly, the plan generator 160 can generate the polygonal tiles in each level to be so sized and shaped that a polygonal tile higher in the hierarchical structure substantially covers a plurality of smaller polygonal tiles lower in the hierarchical structure.

In addition, the indexer 240 can spatially index the grid by correlating the georeferenced physical entities with the polygonal tiles in the different hierarchical levels in the grid. In other words, the indexer 240 can correlate or cross-reference the physical entities and the polygonal tiles in various layers of the hierarchical structure, such the georeference of each physical entity is mapped with the corresponding polygonal tile in each hierarchical level. The indexer 240 can, thus, represent the indoor space by spatially indexing the grid using the hierarchical structure of the polygonal tiles and the georeferenced physical entities.

Further, the plan generator 160 can associate an absolute probability value with each of polygonal tile in the grid. The absolute probability value can indicate the possibility of the presence of a mobile device 110, i.e., a user of the mobile device 110 therein. As an example, the absolute probability value associated with the polygonal tile may indicate the possibility of the mobile device 110 to be present in that polygonal tile from, for instance, a behavioral point of view, instead of the presence of the mobile device 110 at any given point in time.

In an example, the absolute probability value associated with the polygonal tile can be based on a physical entity correlated to the polygonal tile, i.e., the presence of the physical entity in that polygonal tile may have a direct bearing on the absolute probability value linked with the polygonal tile. This may be so because the physical entity may determine the behavior of the user of the mobile device 110 in that polygonal tile and, therefore, the pattern of possibility of presence of the mobile device 110 in the polygonal tile. For instance, the presence of a wall in the polygonal tile, and the area of the polygonal tile covered by the wall can determine the absolute probability value associated with that polygonal tile. This is so because users may, as a behavioral trait, generally avoid walking close to walls and obstacles in the indoor space. Accordingly, in a narrow hallway or passageway, or any other constrained spaces, the user may generally walk in the mid-region of the space. As a similar behavioral trait, the comfort of the users of walking in the indoor space may increase as the distance of the user from the wall or the obstacle increases, till the time the distance is above a certain threshold, for instance, 5 meters. Beyond the distance threshold, the distance from the wall or object may no longer be relevant for their comfort level or their walking behavior in the indoor space. Accordingly, the plan generator 160 can associate different absolute probability values with different polygonal tiles according to their distance from a wall in the indoor space increases.

The plan generator 160 can further create a probability map for the indoor space, the probability map integrating the absolute probability values allocated to each polygonal tile in the entire grid and its various hierarchical levels in the hierarchical structure. Based on the probability map, the plan generator 160 may generate the grid map for the indoor space which can be further used for localizing the mobile device 110.

In the executory phase, as an example, the localizer 180 of the mobile device 110 can use the grid map generated by the indexer 240 above for, amongst other things, providing one or more indoor-location based services by localizing the mobile device 110 in the indoor space. For the purpose, for instance, the localizer 180 can localize the mobile device 110 present in the indoor space for which the grid map, as explained above has been prepared. The localizer 180 can obtain the spatial data generated by the mobile device 110 when the request for localization or a request for ILBS, or both, is received. As an example, the spatial data generated by the mobile device 110 can be information indicative of an instantaneous location, for instance, a local or global location of the mobile device. Accordingly, as an example, the spatial data can include variations, temporal or otherwise, in sensor data obtained from the mobile device which can indicate the instantaneous location of the mobile device. The localizer 180 can compare the spatial data of the mobile device 110 with the set of georeferences for the indoor space, and identify a polygonal tile in the size-wise hierarchy in which the mobile device 110 can be potentially instantaneously located. Based on the potential instantaneous location, the ILBS provider 190 can render an indoor-location based service to the mobile device 110.

Accordingly, in operation for localization, the hierarchical structure of the grid can be used. The mobile device which is present in the indoor space for which the grid map as explained above has been prepared is localized using the techniques of the present subject matter. In said example, tessellating or tiling the hierarchical level or a plane in the grid may forms the basis of spatial indexing in accordance with the present subject matter which allows for appropriate representation of the indoor space, for instance, the geometry of the indoor space, and can be used to quickly access and process the spatial data. With such a tightly packed grid, traversing neighboring polygonal tiles for the purposes of search and localization can be performed quickly. For example, the exercise of comparing the spatial data can be smoothly performed without any interruptions because of the closely packed structure of the polygonal tiles. For example, in case of hexagonal tiles, the comparison can be done in a further structured manner, such as a "ring" of hexagonal tiles which gradually grows. Similarly, routing or navigation, which is essentially the successive traversal of adjacent polygonal tiles in the grid to reach a destination, can be done effectively within the tessellated grid. In addition, services such as, geofencing and targeted marketing can be naturally implemented with smooth transitions in various directions within the grid. Additionally, if for analytics, large amounts of data is to be retrieved from the mobile devices in the grid, the hexagonal tiles may be used effectively to aggregate the spatial data.

Further, the hierarchical grid structure of the present subject matter can allow different resolutions to be used within the hierarchical structure, for example, based on a given requirement. For example, a high resolution, i.e., at lower hierarchical level having small polygonal tiles, may be used when localizing a single mobile device, while a low resolution, i.e., at higher hierarchical levels having large polygonal tiles, may be more useful when aggregating, accessing, or processing a large set of spatial data for localization. Accordingly, during operation, a polygonal tile at certain hierarchical level in the size-wise hierarchy can be selected, the hierarchical level being different from the one at which the polygonal tile has been earlier identified, the identified polygonal tile, for instance, having the mobile device potentially located therein.

In addition, the provision of the hierarchical structure and the ability to change the resolution at which, for example, the localization is to be performed, also allows for efficient operation. For instance, to start with, the localization may start at a given hierarchical level, where the polygonal tile potentially containing the mobile device may be determined and, thereafter, a narrower region can be selected for localization. Therefore, for a subsequent degree or step of identification, i.e., for the subsequent narrowing of the localization, one amongst the plurality of polygonal tiles contained within the identified polygonal tile can be selected. The process can be repeated for various subsequent degrees or steps for further enhancing the resolution of the search, thereby enhancing the accuracy with which the exact location is localized. As will be understood, the accuracy of localization is directly related to the size of the polygonal tile at the selected level, i.e., the narrower or smaller the polygonal tile, greater may be the accuracy of localization, and greater may be the computational resources and time needed for localization. The selectivity of the hierarchical level allows the user to decide and obtain the localization, based on whether accuracy is paramount or the speed of localization. In another example, geofences can be implemented at various resolutions, thus saving processing time as well as memory for storing the associated spatial information. For instance, a geofence constituting of several hundred polygonal tiles in a high-resolution grid, may effectively be reduced to only a handful of polygonal tiles in a low-resolution grid. In one other example, Furthermore, different models of targeted marketing may be implemented at different hierarchical levels of the grid. For instance, at high resolution, diverse promotional marketing triggered at different spatial positions contained within the same region, such as a store can be implemented, while at lower resolution, key features or services which are targeted either at individuals or for a particular location can be implemented.

Moreover, resolution requirements may vary amongst different regions or environments in the indoor space, such as between open and congested space. For example, for the same indoor space, for a crowded space, such as a narrow hallway, a higher resolution of the grid can be selected, whereas for open spaces, a lower resolution of the grid can be selected. In other words, a different hierarchical level than that already selected for one region can be selected for another region of the indoor space from the hierarchical levels of the grid.

Figure 2:
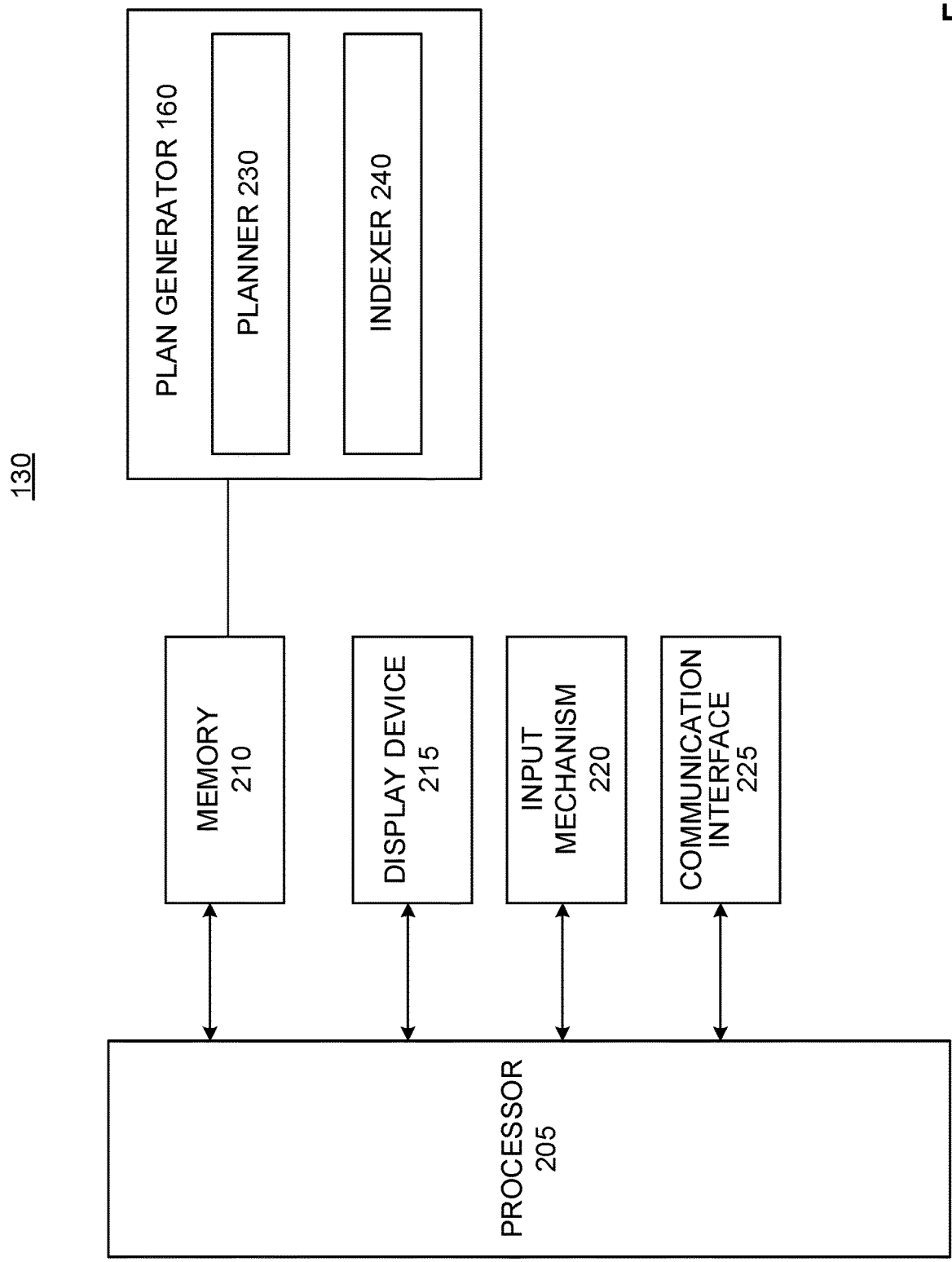
FIG. 2 illustrates, as an example, an architecture of a server for localizing mobile devices in an indoor space using grid-based representation of map constraints.

FIG. 2 illustrates an example architecture of the server 130 for localization using grid-based representation of map constraints. In an example, the server 130 provides for the generation of a tessellated hierarchical grid which is used to represent the indoor space and, in which, the hierarchical level, which indicates the level of granularity of the localization, is selectable. The server 130, in an embodiment architecture, may be implemented on one or more server devices, and includes a processor 205, memory 210 which may include a read-only memory (ROM) as well as a random access memory (RAM) or other dynamic storage device, display device 215, input mechanisms 220 and communication interface 225 for communicative coupling to communication network 140. The processor 205 is configured with software and/or other logic (such as plan generator 160) to perform one or more processes, steps and other functions described with implementations, such as described by FIGS. 1, 2, and 4 herein. The processor 205 may process information and instructions stored in the memory 210, such as provided by a random-access memory (RAM) or other dynamic storage device, for storing information and instructions which are executable by the processor 205. The memory 210 also may be used for storing temporary variables or other intermediate information during execution of instructions to be executed by the processor 205. The memory 210 may also include the ROM or other static storage device for storing static information and instructions for processor 205; a storage device, such as a magnetic disk or optical disk, may be provided for storing information and instructions. Communication interface 225 enables the server 130 to communicate with one or more communication networks, such as the network 140 (e.g., cellular network) through use of the network link (wireless or wired). Using the network link, the server 130 can communicate with mobile devices 110.

The server 130, among other components, may include the planner 230 and the indexer 240. The planner 230 and the indexer 240 may include processor-executable instructions stored in RAM, in one embodiment, in the memory 210 and may include sub-modules for carrying out various operations and functions.

As explained previously, the planner 230 and the indexer 240 cooperate with each other to generate a grid map which is further supplemented and processed for use for localization of the mobile device 110. The representation of the indoor space by a hierarchical grid structure allows a user to select at which hierarchical level, and therefore, at what resolution or level of granularity is the localization of the mobile device 110 to be performed. As an example, the selection of the resolution can allow for selecting a precision-level with which the localization of the mobile device 110 is performed.

Figure 3A:
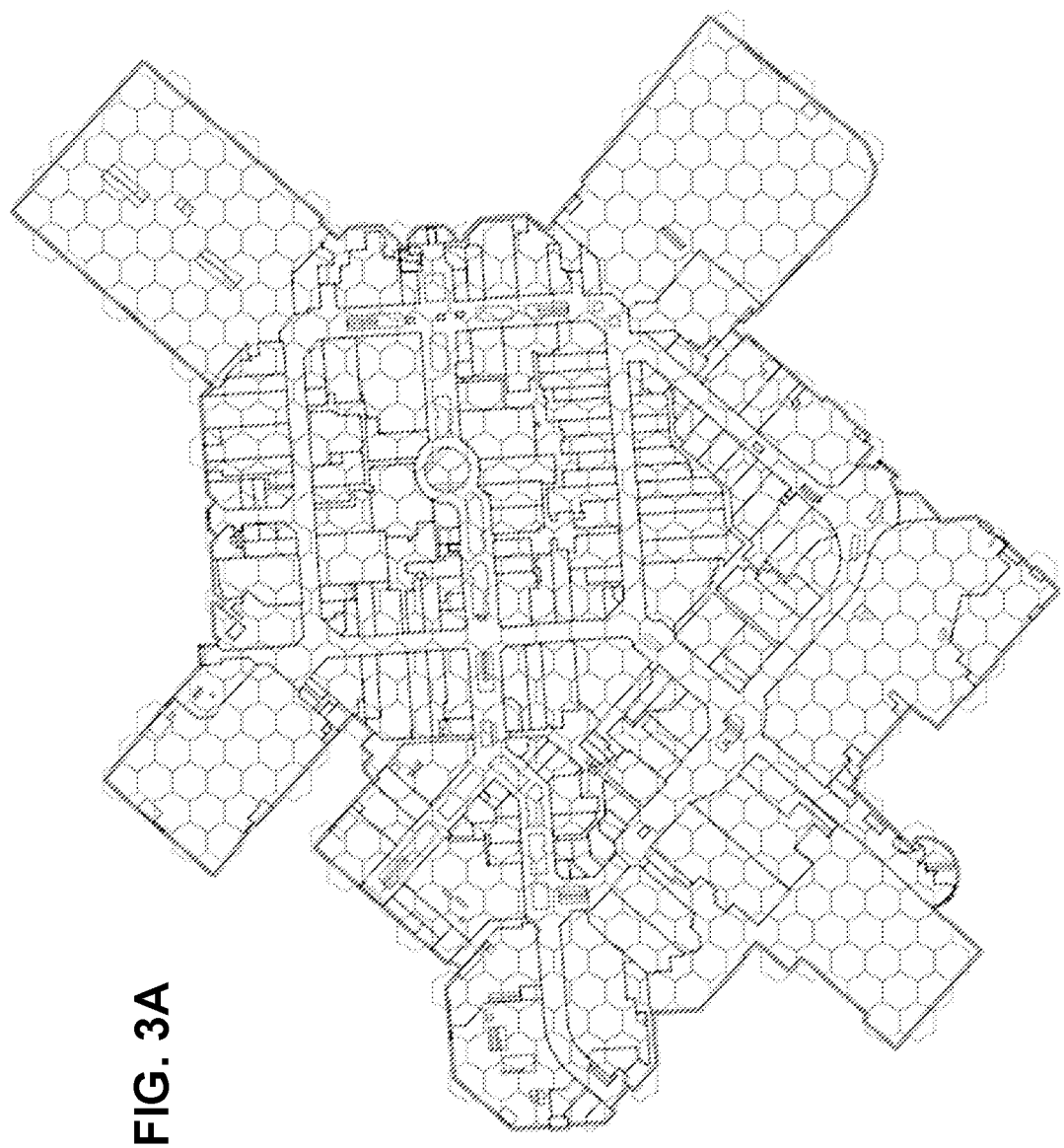
FIG. 3A and FIG. 3A' illustrates the indoor space divided plan into a plurality of polygonal tiles, according to various examples of the present subject matter.
Figure 3A:
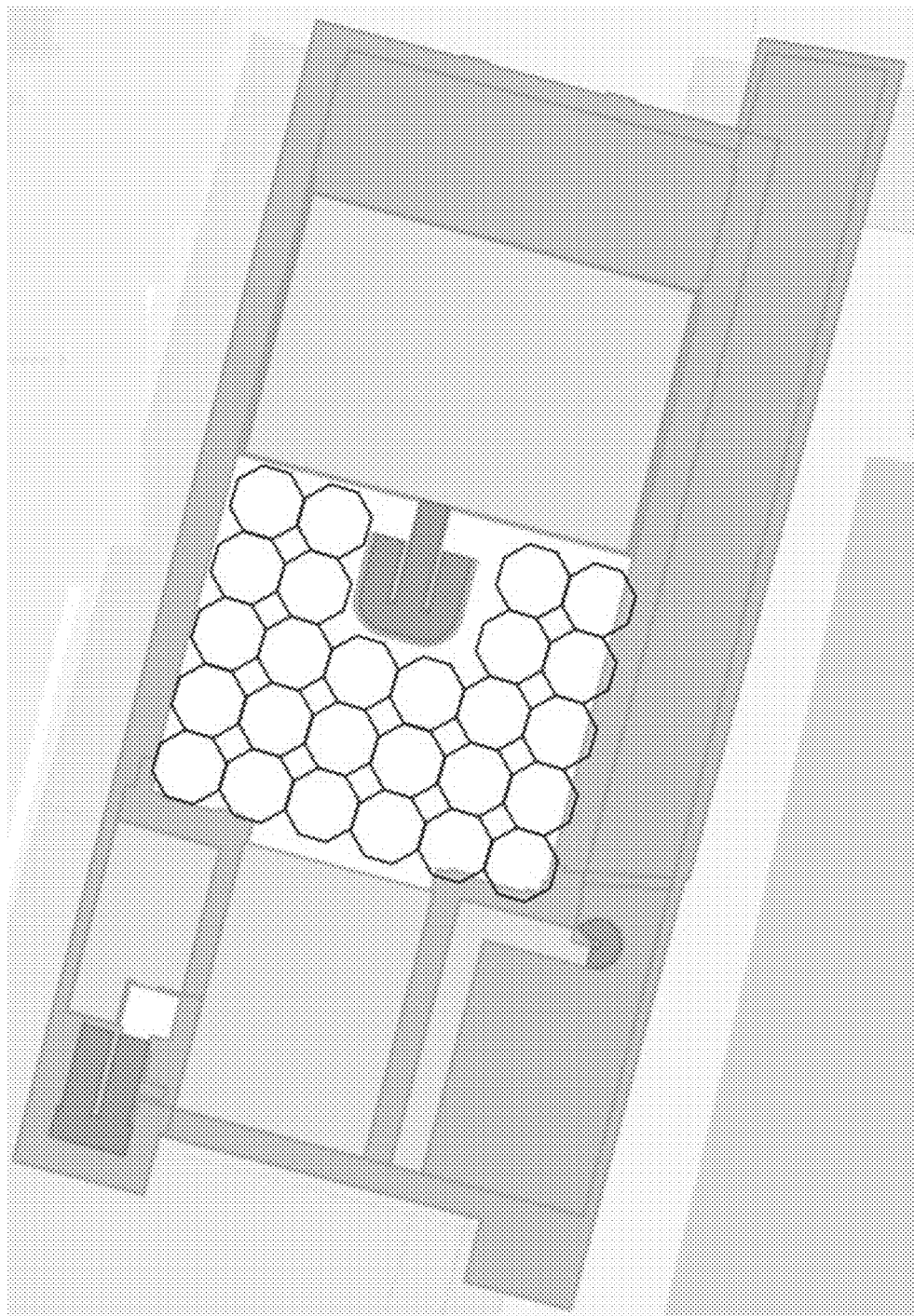
Figure 3B:
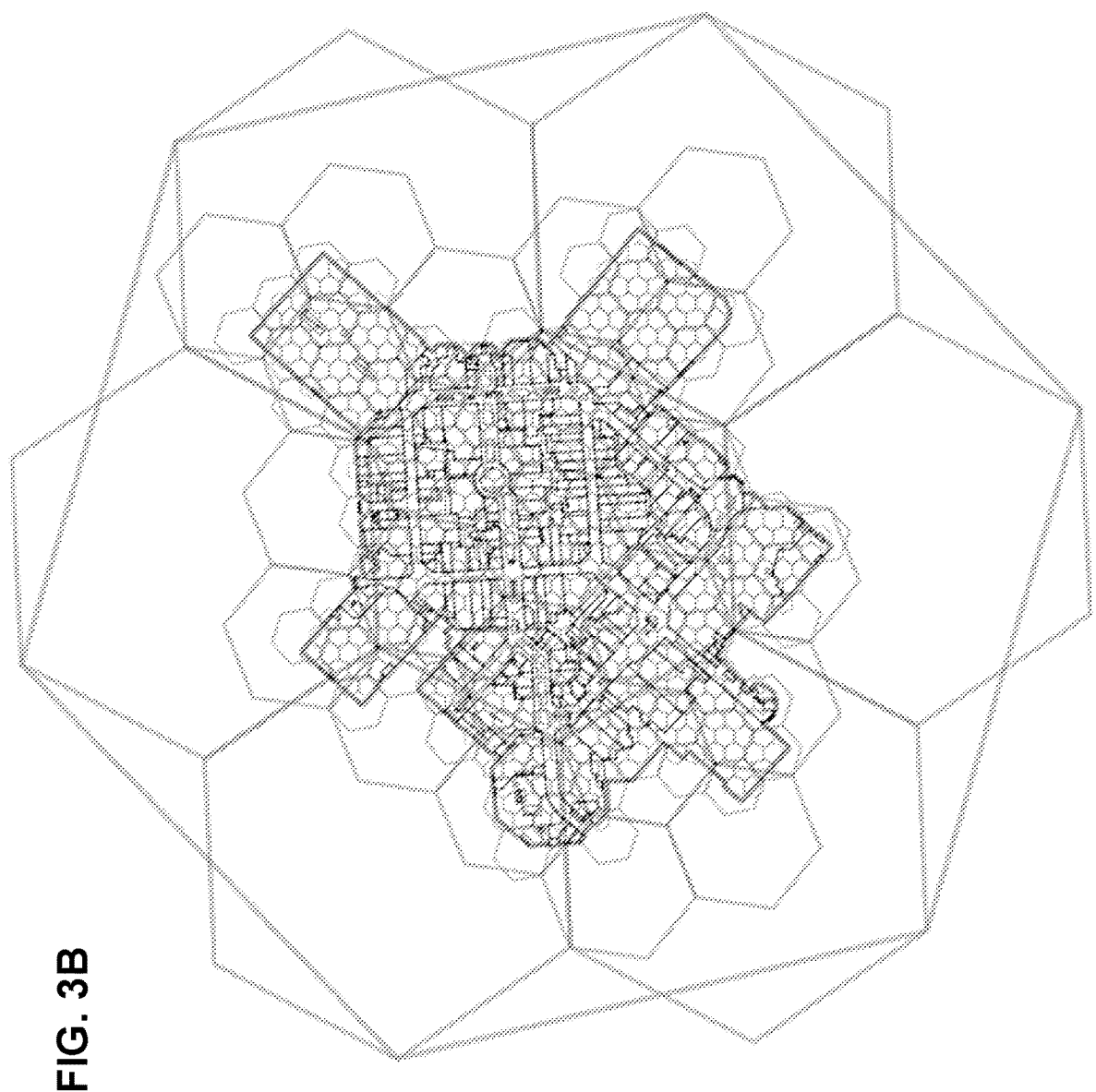
FIG. 3B illustrates, as an example, the indoor space represented as a hierarchical grid.

The planner 230, as part of the generation of the grid map, can represent the indoor space as a grid having multiple planes arranged in a stack. As an example, the planner 230 may obtain the floor plan of the indoor space in any raster format, and begin by dividing the floor plan into a plurality of polygonal tiles, shown as an example in FIG. 3A, and overlay the floor plan with the stacked planes. Each plane is made of tessellated polygonal tiles, i.e., polygonal tiles abutting adjacent polygonal tiles and the multi-planar structure forms a hierarchically-related structure of such polygonal tiles in which the polygonal tiles in one plane of the hierarchical structure bear a relationship with the polygonal tiles in the plane above and below that plane. Such planes, also referred to as the hierarchical levels of the grid, contain the polygonal tiles which form the basic building block of the representation which is used to depict the indoor space. The planner 230 can generate the polygonal tiles in each hierarchical level to be so sized and shaped that a polygonal tile higher in the hierarchical level can be, with certain approximation, represented by a collection of polygonal tiles in at least one lower hierarchical level, whether immediately adjacent to the hierarchical level or not. For instance, a polygonal tile higher in the hierarchical structure can contain within it a plurality of smaller polygonal tiles that are lower in the hierarchical structure. As an example, the indoor space represented as the hierarchical grid of multi-layered polygons of different sizes is shown in FIG. 3B. In the example shown, the grid may be made of two-dimensional layers of polygonal tiles. In other examples, however, the hierarchical grid may be a three-dimensional grid involving three-dimensional volumes which are binned for carrying out the operation as envisaged by the present subject matter.

The planner 230 may use polygonal tiles of various shapes and sizes for creating the grid. In one example, planner 230 may use symmetrical polygonal-shaped tiles, such as a hexagonal tile, for creating the grid. In another example, planner 230 may use the polygonal tiles that have the same asymmetrical shape or have different symmetrical shapes. For instance, the planner 230 may use differently sized triangles to cover the entire indoor space, represented by a hierarchical level in the grid. In yet another example, the planner 230 may use polygonal tiles made of two or more different symmetrical shapes, in the same hierarchical level as part of representing the indoor space using the grid, as shown in FIG. 3A', where octagons and rhombuses or squares are used for creating the grid.

In one other example, the planner 230 may use polygonal tiles made of two or more different symmetrical shapes in different hierarchical levels. The planner 230 may make one hierarchical level using a first set of polygonal tiles that are of a first symmetrical shape and make another hierarchical level using a second set of polygonal tiles that are of a symmetrical second shape, with the polygonal tiles in the lower hierarchical level and the higher hierarchical level bearing a genus-species relationship with each other. For instance, the planner 230 can use symmetric triangular tiles in the lower hierarchical level and use rhombus-shaped tiles in the higher hierarchical level. In addition, in the same example, in case the tiles in the lower hierarchical level are triangular, and the ones in the higher hierarchical level are rhombus-shaped, the planner 230 may use hexagonal tiles in a still higher hierarchical level which may substantially contain within it the rhombus-shaped tiles as well as the triangular tiles of the lower hierarchical levels.

In said examples, the polygonal tiles having a symmetrical shape can allow for effective operation in respect to the spatial indexing. For instance, the symmetrical hexagon-shaped polygonal tiles, whether formed as a complete hexagonal tile or by the combination of other symmetrical or asymmetrical polygonal tiles, can offer the densest packing for any lattice at any given hierarchical level and can, therefore, provide a high degree of quantization for a given hierarchical level and a given area of the indoor space. This means that the hexagonal tile can be selected at a high resolution which, in turn, can accurately localize the mobile device 110. In addition, the hexagonal tiles allow for packing such that no regions in the indoor space remain unmapped. Therefore, the natural asymmetry in a hexagonal tile can provide high accuracy and a smooth approximation of the curves contained in the tiles. In addition, the centroids of all the adjacent polygonal tiles are equidistant and, therefore, this can allow for smooth transitions between the polygonal tiles in all directions in an orderly manner.

Further, the indexer 240 can achieve the spatial indexing of the grid by correlating the physical entities and the polygonal tiles in various layers of the hierarchical structure, such that the georeference of each physical entity is mapped with the corresponding polygonal tile in each hierarchical level. The georeference of the physical entity, correlated with the polygonal tile, can be any information which can be used to indicate the position or location of the physical entity or the polygonal tile(s) associated therewith. In one example, as part of georeferencing, the indexer 170 may use global or absolute coordinates, such as geographical coordinates in the form of longitudinal and latitudinal information, to indicate the location of the physical entities. In other examples, the indexer 170 may use a local coordinate system, for instance, associated with the indoor space, for georeferencing the physical entities. In still other examples, the indexer 170 may use any other manner of indicating the location of the physical entities, for example, without using a coordinate system.

The indexer 240 can, thus, represent the indoor space by spatially indexing the grid using the hierarchical structure of the polygonal tiles and the georeferenced physical entities. The indexer 240, in the present example, can interlink the polygonal tiles in different hierarchical levels to enhance the flexibility with which the spatial indexing implemented. For example, with such a spatial indexing, the indexer 240 can create a tree (or a tree-like) hierarchical structure, which allows for an effective manner of retrieval of the information from a particularly large collection of data such as that used for localization. In other words, in said example, as part of the spatial indexing performed, each child polygonal tile can be hierarchically linked to the polygonal tile at a higher level in the hierarchical structure so as to spatially index the grid into a tree-like hierarchical structure.

As an example, the spatial data, used for the georeferencing in said example, can include variations, temporal or otherwise, in sensor data obtained from the mobile device which can indicate the instantaneous location of the mobile device. In said example embodiments, the sensor data can include mobile device wireless signal data including signal strength and connectivity, inertial data, barometric data, magnetic data and other mobile device data may be gathered at positions along a trajectory of motion. In addition, the sensor data may include Wi-Fi received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data. The sensor data, as described above, may all be useable as input parameters for joint fusion with fingerprint location data. In some embodiments, the joint fusion, also referred to as data fusion herein, can be performed using a Bayesian filter, a Kalman filter, a Rodriguez filter, or any suitable method of jointly fusing input data to determine a position of the mobile device, or localize the mobile device, based on the data fusion. Estimating a trajectory of the mobile device in accordance with the data fusion may be based on the wireless signal data, inertial data, barometric data, magnetic data and other mobile device data may include such as, but not limited to, instantaneous inertial sensor measurements including directional heading and step length, short-term inertial sensor measurement history within a specified time window, Wi-Fi received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data. Accordingly, in an example, the sensor data may include a first set of sensor data signals acquired by the mobile device 110 and a second set of sensor data generated by the mobile device 110. For instance, the data from the inertial sensors can be the sensor data generated by the mobile device 110 and the part of the data from the signal sensors can be the sensor data acquired by the mobile device 110 while part of the signal data may be generated by the mobile device 110 itself.

As an example, as part of spatial indexing the grid, an identifier can be associated with each of the polygonal tiles in the hierarchical structure and the identifier can have the georeference embedded therein. In other words, the identifier may be used to signify the association of the polygonal tile with physical entities on the floor map. For instance, the identifier may be a number, a tuple, a label, or of any format that allows re-constructing the corresponding polygonal tile with little or no error. The georeferenced information may be embedded, directly or indirectly, into the identifier itself by, for example, passing the georeferenced data (processed or raw) through a function to generate the identifier, such that when the function is inverted and applied to the identifier, the actual georeferenced data may be retrieved therefrom. In another example, possibility involves implementing an identifier allocation scheme that the parameters associated with the polygonal tile, such as orientation, size, and neighboring polygonal tiles, and the actual georeference, can be used for interpreting the georeferenced data associated with the polygonal tile. This may provide a way of efficiently storing the spatial indexing information associated with the grid.

In addition, according to an aspect, the indexer 240 can associate an absolute probability value with each of polygonal tile in the grid. The absolute probability value can indicate the possibility of the presence of a mobile device 110, i.e., a user of the mobile device 110 therein. As an example, the absolute probability value of a polygonal tile, as is clear from the name, may not indicate the possibility of the mobile device 110 being present in that polygonal tile at a given instant. Instead, the absolute probability value associated with the polygonal tile may indicate the possibility of the mobile device 110 to be present in that polygonal tile from, for instance, a behavioral point of view. In other words, the absolute probability value indicates whether the mobile device 110 can be present in that polygonal tile, without any temporal context, instead of indicating the probability of the mobile device 110 being or not being present in the polygonal tile at any given instant (which indicates a temporal connotation). The probability map so created is also, therefore, indicative of a similar metrics.

In an example, the absolute probability value associated with the polygonal tile can be based on a physical entity correlated to the polygonal tile, i.e., the presence of the physical entity in that polygonal tile may have a direct bearing on the absolute probability value linked with the polygonal tile. This may be so because the physical entity may determine the behavior of the user of the mobile device 110 in that polygonal tile and, therefore, the pattern of possibility of presence of the mobile device 110 in the polygonal tile.

For instance, the presence of a wall in the polygonal tile, and the area of the polygonal tile covered by the wall can determine the absolute probability value associated with that polygonal tile. This is so because users may, as a behavioral trait, generally avoid walking close to walls and obstacles in the indoor space. Accordingly, in a narrow hallway or passageway, or any other constrained spaces, the user may generally walk in the mid-region of the space. Therefore, according to an aspect, the absolute probability values associated with polygonal tiles increases as distance of the polygonal tiles from a wall in the indoor space increases. In addition, at block 430, maximum absolute probability value is associated with the polygonal tiles located in a mid-region of a narrow path in the indoor space.

As a similar behavioral trait, the comfort of the users of walking in the indoor space may increase as the distance of the user from the wall or the obstacle increases, till the time the distance is above a certain threshold, for instance, 5 meters. Beyond the distance threshold, the distance from the wall or object may no longer be relevant for their comfort level or their walking behavior in the indoor space. Accordingly, at block 430, the minimum absolute probability value is associated with the polygonal tiles located adjacent to a wall in the indoor space. For instance, a threshold distance may be determined which can indicate the proximity from the wall at which the users are most uncomfortable with while walking and, as a behavioral trait, may not want to walk at that much closeness to the wall.

The indexer 240 can associate each of the polygonal tiles in the various hierarchical levels with an absolute probability value. Accordingly, the indexer 240 can create a probability map for the indoor space, the probability map integrating the absolute probability values allocated to each polygonal tile in the entire grid and its various hierarchical levels in the hierarchical structure. Further, the indexer 240 can generate the grid map for the indoor space based on the probability map and can be further used for localizing the mobile device 110. In one example, the indexer 240 can represent the entire indoor space by tessellated polygonal tiles with each polygonal tile having the absolute probability value associated therewith. In an example, the indexer 240 may even visually represent the grid map as a heat map with areas of minimum absolute probability value shown as red and the ones with maximum absolute probability shown as green, and the variations in the colors from red to green indicating the in-between values of absolute probability.

The provision of the hierarchical grid having multi-sized polygonal tiles at various levels allows the same indoor space to represented at different resolutions, i.e., with varying level of granularity of the distribution of the absolute probability values along the indoor space. In turn, the same provision may allow viewing the indoor space at various resolutions, which as explained later may allow a deliberate choice between accuracy and computational viability.

Further, based on the probability map-based grid map, the server 130 may perform calibration of the indoor space for generating a fingerprint map which can be further used for localization. In order to build a fingerprint repository for indoor positioning applications, the server may collect the spatial data (referred to as reference data) at known locations, i.e., for each of the georeferenced polygonal tile in the various hierarchical levels in the grid. The calibration is performed by collecting the spatial data using a data collection device, such as a mobile phone, in the various polygonal tiles in the grid to collect data. As mentioned previously, depending on whether a high spatial resolution of the data is required or a low spatial resolution is required, the hierarchical level with which the fingerprint data is associated can be selected, which in turn, can be used to make an educated choice between efficiency of acquiring the data and the accuracy with which the data can perform localization.

As a consequence of the calibration by the server 130, in an example, the server 130 may also include a fingerprint data repository (not shown in figures), which may be communicatively accessible to mobile device 110, via the network 140. In alternate embodiments, the fingerprint data repository, or any portion(s) thereof, may be stored in a memory of mobile device 110.

The terms fingerprint and fingerprint data as used herein refer to time-correlated or time-stamped, individual measurements of any of, or any combination of, received wireless communication signal strength and signal connectivity parameters, magnetic field measurements and barometric pressure measurements, and mobile device inertial sensor data at known, particular locations within an area being traversed, or anticipated for traversal, by the mobile device. In other words, a fingerprint includes a correlation of sensor and signal information including, but not necessarily limited to wireless signal strength, magnetic and barometric data, and inertial sensor information time-correlated for respective positions or coordinate locations within the area or facility being traversed. For instance, barometric fingerprint data associated with contiguous locations or positions may establish a pattern or signature that uniquely correlates to that particular sequence of locations or positions. Once a particular as-measured value, a pattern or signature based on any one or more of received wireless communication signal strength and signal connectivity parameters, magnetic field parameters or barometric pressure parameters, and mobile device inertial sensor data is detected or recorded by the mobile device 110, the value or pattern as detected may be matched to a reference fingerprint stored in a fingerprint map of a given facility, for example as stored in positioning fingerprint data repository, to identify the unique position of the mobile device relative to the facility, a process also referred to herein as localization.

A sequence of positions or locations that constitute a navigation path traversed by mobile device 110 relative to the pedestrian area may be mapped for fingerprint data during a fingerprint calibration process. In some embodiments, given that sampling times and sampling rates applied in conjunction with particular mobile device sensors may be different, the signal and sensor information as measured during a fingerprint calibration process may be aggregated and fused, for example, time-averaged, across particular periods of time, with the aggregated and fused value being used to represent the signal information at any given instance of time within that particular period of time in which the signal information is aggregated and fused. The fingerprint data may be used to track the mobile device 110 traversal along an indoor route within, and even adjoining, the pedestrian area. As will be understood, the data collection as well as the association, for calibration and fingerprint generation integrated with the spatial indexing, is performed in the context of the tessellated, hierarchical grid generated by the planner 230 and the indexer 240, as discussed previously.

The calibrated fingerprint data, integrated with the georeferences of the various physical entities, obtained by the server 130 in combination with the hierarchical grid forms the grid map-representation of the indoor space which can be further used for localizing the mobile device 110 to render ILBS to the mobile device 110, as has been explained earlier and is explained in further detail below.

According to the aspect explained above, owing to the hierarchical grid structure of representing the indoor space, a localization device, such as a device implementing the localizer 180, is enabled to select, for instance, at the time of performing the localization or otherwise, the level of granularity at which the localization is to be performed. In other words, the localization device can select whether to determine a pin-pointed location of the mobile device 110 or to determine the general region in which the mobile device 110 is located. For example, the localization device may select a high resolution or low level of granularity, i.e., localization at lower hierarchical level having small polygonal tiles, when localizing a single mobile device. On the other hand, the localization device can select a low resolution or a high level of granularity, i.e., localization at higher hierarchical levels having large polygonal tiles, when aggregating, accessing, or processing a large set of spatial data for localization and when the exact location may not be required and a general region in which the mobile device 110 is located is sufficient. Further, the localization device may be enabled to select a different hierarchical level for another region of the indoor space than that already selected for one region of the indoor space, for example, as the mobile device 110 moves within the indoor space and the localization device attempts to localize the mobile device 110. For instance, the localization device may be configured to select different resolutions in different regions of the indoor space given the resolution requirements that may vary amongst different regions or environments in the indoor space. For example, in case of a crowded space, such as a narrow hallway, the localization device may select a higher resolution of the grid such that the speed of localization remains substantially unaffected even with a greater amount of spatial data being processed upon such a selection. In case of an open spaces, in contrast, the localization device selects a lower resolution of the grid since a large amount of data may have to be processed and a high resolution may involve expenditure of considerable time and processing resources.

Such an ability to select the level of granularity or the hierarchical level, which in turn selects the size of the polygonal tiles in which the localization exercise is performed, allows scalability of the indoor positioning exercise. Accordingly, it enables a deliberate, choice-based tradeoff between the exercise being accurate and the exercise being computationally viable.

Methodology

FIG. 4 illustrates, as an example, a method 400 of localizing a mobile device in an indoor space using grid-based representation of map constraints. In describing examples of FIG. 4, reference is made to the examples of FIGS. 1-3 for purposes of illustrating suitable components or elements for performing a step or sub-step being described. For the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 4 examples of method steps described herein are related to a server, such as the server 130, to facilitate spatial-resolution selection for localization of mobile devices, such as mobile device 110. According to one embodiment, the techniques are performed by the processor 205 executing one or more sequences of software logic instructions that constitute the plan generator 160 of the server 130. In embodiments, the plan generator 160 may include the one or more sequences of instructions within sub-modules. Such instructions may be read into the memory 210 from machine-readable medium, such as memory storage mobile devices. Execution of the sequences of instructions contained in the plan generator 160 in the memory 210 causes the processor 205 to perform the process steps described herein. It is contemplated that, in some implementations, some of the sub-modules, or any other portions of executable instructions constituting the plan generator 160 may be hosted at a remote device other than at the server 130. In alternative implementations, at least some hard-wired circuitry may be used in place of, or in combination with, the software logic instructions to implement examples described herein. Thus, the examples described herein are not limited to any particular combination of hardware circuitry and software instructions. Further, in other embodiments, the method 400 may be implemented in its entirety or at least partially using the mobile device 110.

At block 410, the indoor space is divided into a grid of tessellated polygonal tiles, i.e., polygonal tiles abutting adjacent polygonal tiles. The grid can be a multi-layered, hierarchical structure of such polygonal tiles, where the polygonal tiles in each level or layer of the hierarchical structure bear a relationship with the polygonal tiles in the level above and below that level. In other words, the floor plan of the indoor space can be obtained in any raster format and overlaid with the stacked planes, where each plane is made of polygonal tiles abutting adjacent polygonal tiles, the polygonal tiles forming the basic building block of the representation which is used to depict the indoor space. Such a multi-planar structure forms the hierarchically-related structure of polygonal tiles in which the polygonal tiles in one hierarchical level or plane bear a relationship with the polygonal tiles in the plane above and below that plane. For instance, the polygonal tiles in each hierarchical level are so sized and shaped that a polygonal tile higher in the hierarchical level can be, with certain approximation, represented by a collection of polygonal tiles in at least one lower hierarchical level, whether immediately adjacent to the hierarchical level or not. For instance, a polygonal tile higher in the hierarchical structure can contain within it a plurality of smaller polygonal tiles that are lower in the hierarchical structure.

At block 420, physical entities in the indoor space and the polygonal tiles in various layers of the hierarchical structure can be correlated against each other. The physical entities can include, for example, walls, passages, hallways, elevator shafts, escalators, open spaces, doorways, hallway, kiosks, stores, alleys, holes, café, and salon. In other words, the physical entities can be any meaningful label that can be associated with the polygonal tile by way of the correlation therebetween. In addition, a local or global position of the physical entities using a coordinate system, referred to as georeference of the physical entities, is also identified in the indoor space. As mentioned earlier, the local or global location is used to indicate the location as determined on the basis of an absolute coordinate system, such as in respect of a local or a global coordinate system. In one example, as explained above, the georeference can be any information which can be used to determine the location of the physical entity. Further, the correlation between the physical entities and the corresponding polygonal tiles can be such that the georeference of each physical entity is mapped with the corresponding polygonal tile in each hierarchical level. For example, with such a correlation, a tree (or a tree-like) hierarchical structure of the grid can be created which represents the indoor space and which allows for an effective manner of retrieval of the information from a particularly large collection of data such as that used for localization.

Subsequently at block 430, an absolute probability value indicative of the potential instantaneous location of a device therein is associated with each of polygonal tile in the grid. In other words, the polygonal tiles in the various hierarchical levels are each associated with an absolute probability value. Accordingly, the absolute probability value can be allocated to each polygonal tile in the entire grid and its various hierarchical levels in the hierarchical structure, thereby creating a probability map for the indoor space.

According to an aspect, the possibility of the presence indicated by the absolute probability value can determine the possibility of the presence of a mobile device 110, i.e., a user of the mobile device 110 therein. As an example, the absolute probability value of a polygonal tile, as is clear from the name, does not indicate the possibility of the mobile device 110 being present in that polygonal tile at a given instant. Instead, the absolute probability value associated with the polygonal tile may indicate the possibility of the mobile device 110 to be present in that polygonal tile from, for instance, a behavioral point of view. In other words, the absolute probability value indicates whether the mobile device 110 can be present in that polygonal tile, without any temporal context, instead of indicating the probability of the mobile device 110 being or not being present in the polygonal tile at any given instant (which indicates a temporal connotation). The probability map so created is also, therefore, indicative of a similar metrics. For instance, the absolute probability value associated with the polygonal tile can be based on a physical entity correlated to the polygonal tile, i.e., the presence of the physical entity in that polygonal tile may have a direct bearing on the behavior of the user of the mobile device 110 in that polygonal tile and, therefore, the pattern of possibility of presence of the mobile device 110 in the polygonal tile. For example, the presence of a wall in the polygonal tile, and the area of the polygonal tile covered by the wall can have a bearing on the absolute probability value associated with that polygonal tile because users may, as a behavioral trait, generally avoid walking close to walls and obstacles in the indoor space. As a similar behavioral trait, the comfort of the users of walking in the indoor space may increase as the distance of the user from the wall or the obstacle increases, till the time the distance is above a certain threshold.

As an example, the absolute probability value of a polygonal tile, as is clear from the name, does not indicate the possibility of the mobile device 110 being present in that polygonal tile at a given instant. Instead, the absolute probability value associated with the polygonal tile may indicate the possibility of the mobile device 110 to be present in that polygonal tile from, for instance, a behavioral point of view. In other words, the absolute probability value indicates whether the mobile device 110 can be present in that polygonal tile, without any temporal context, instead of indicating the probability of the mobile device 110 being or not being present in the polygonal tile at any given instant (which indicates a temporal connotation). The probability map so created is also, therefore, indicative of a similar metrics.

In an example, the absolute probability value associated with the polygonal tile can be based on a physical entity correlated to the polygonal tile, i.e., the presence of the physical entity in that polygonal tile may have a direct bearing on the absolute probability value linked with the polygonal tile. This may be so because the physical entity may determine the behavior of the user of the mobile device 110 in that polygonal tile and, therefore, the pattern of possibility of presence of the mobile device 110 in the polygonal tile.

For instance, the presence of a wall in the polygonal tile, and the area of the polygonal tile covered by the wall can determine the absolute probability value associated with that polygonal tile. This is so because users may, as a behavioral trait, generally avoid walking close to walls and obstacles in the indoor space. Accordingly, in a narrow hallway or passageway, or any other constrained spaces, the user may generally walk in the mid-region of the space. Therefore, according to an aspect, the absolute probability values associated with polygonal tiles increases as distance of the polygonal tiles from a wall in the indoor space increases. In addition, at block 430, maximum absolute probability value is associated with the polygonal tiles located in a mid-region of a narrow path in the indoor space.

As a similar behavioral trait, the comfort of the users of walking in the indoor space may increase as the distance of the user from the wall or the obstacle increases, till the time the distance is above a certain threshold, for instance, 5 meters. Beyond the distance threshold, the distance from the wall or object may no longer be relevant for their comfort level or their walking behavior in the indoor space. Accordingly, at block 430, the minimum absolute probability value is associated with the polygonal tiles located adjacent to a wall in the indoor space. For instance, a threshold distance may be determined which can indicate the proximity from the wall at which the users are most uncomfortable with while walking and, as a behavioral trait, may not want to walk at that much closeness to the wall.

At block 440, a grid map of the indoor space can be generated based on the probability map and can be further used for localizing the mobile device 110. In an example, the grid map can include calibrated fingerprint data, integrated with the georeferences of the various physical entities, and integrated with the hierarchical grid. As an example, the grid map can be a representation of the indoor space, for instance, of the floor plan of the indoor space, in terms of the hierarchically arranged polygonal tiles forming the tessellated grid structure as well as indicative of the grid-based map constraints, i.e., the various map constraints in the floor plan along with the tessellated grid structure.

Although the hierarchical structure, as envisaged by the present subject matter, has been described with the polygons higher in the hierarchy having a bigger size and smaller-sized polygonal tiles at lower levels of the hierarchy, any other manner of correlating the shapes and sizes of the polygonal tiles in the multiple layers may be implemented. For example, the hierarchy may be inverted and, instead, a larger polygonal tile may be lower in the hierarchy with respect to the smaller polygonal tiles.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A computer implemented method comprising:
   dividing, by a processor, an indoor space into a grid of a plurality of polygonal tiles abutting adjacent polygonal tiles, the grid comprising a hierarchical structure of the plurality of polygonal tiles, wherein a polygonal tile at a level in the hierarchical structure is representable by polygonal tiles at other levels in the hierarchical structure;
   correlating, by the processor, the grid with physical entities in the indoor space, the correlating comprising associating each physical entity with a polygonal tile from amongst the plurality of polygonal tiles;
   associating, by the processor, with each of the plurality of polygonal tiles an absolute probability value of presence of a mobile device therein, wherein the associating comprises allocating the absolute probability value with each of the plurality of polygonal tiles in each hierarchical level in the hierarchical structure to create a probability map for the indoor space, and wherein the absolute probability value indicates whether the mobile device can be present in the polygonal tile, without any temporal context, instead of indicating the probability of the mobile device being present in the polygonal tile at any given instant, and wherein different absolute probability values are associated with different polygonal tiles based on a distance of the polygonal tile from the physical entity in another polygonal tile;
   generating, by the processor, a grid map for the indoor space based on the probability map;

based on the probability map based grid map, performing calibration of the indoor space for generating a fingerprint map for the indoor space, the calibration comprising obtaining spatial data at known locations for each of the georeferenced polygonal tile in the various hierarchical levels in the grid; and providing, by the processor, indoor positioning services to mobile devices in the indoor space using the grid map, wherein the mobile devices are to perform localization based on corresponding spatial data in conjunction with the fingerprint map.

2. The method of claim 1, wherein the absolute probability value associated with a polygonal tile increases as distance of the polygonal tile from a wall in the indoor space increases.

3. The method of claim 1, wherein the absolute probability value is maximum for the polygonal tile located in a mid-region of a narrow path in the indoor space.

4. The method of claim 1, wherein the absolute probability value is minimum for the polygonal tile located adjacent to a wall in the indoor space.

5. The method of claim 1, wherein the correlating comprises:

georeferencing each of the physical entities in the indoor space; and spatially indexing the grid with the physical entities in the indoor space to correlate a georeference of each physical entity with the polygonal tile from amongst the plurality of polygonal tiles at each hierarchical level.

6. The method of claim 1, wherein the absolute probability value associated with the polygonal tile is based on a physical entity correlated to the polygonal tile, the correlation indicative of presence of the physical entity in that polygonal tile.

7. The method of claim 1, wherein the physical entities comprise walls, passages, elevator shafts, escalators, open spaces, and doorways.

8. The method of claim 1, wherein the plurality of polygonal tiles have a symmetrical hexagon shape.

9. The method of claim 1, wherein the plurality of polygonal tiles have one of a same asymmetrical polygon shape and different symmetrical polygon shapes.

10. The method of claim 1, wherein a first set of polygonal tiles in one hierarchical level in the hierarchical structure are symmetrical and of a first shape and a second set of polygonal tiles in another hierarchical level in the hierarchical structure are symmetrical and of a second shape, wherein a plurality of second set of polygonal tiles cover a single polygonal tile from the first set.

11. A server computing device comprising:
a processor; and
a memory storing a set of instructions, the instructions executable in the processor to:
divide an indoor space into a grid of a plurality of polygonal tiles abutting adjacent polygonal tiles, the grid comprising a hierarchical structure of the plurality of polygonal tiles, wherein each polygonal tile at a level in the hierarchical structure is representable by polygonal tiles in other levels in the hierarchical structure;
correlate the grid with physical entities in the indoor space, the correlating comprising associating each physical entity with a polygonal tile from amongst the plurality of polygonal tiles;
associate with each of the plurality of polygonal tiles an absolute probability value indicative of a potential instantaneous location of a mobile device therein, wherein the associating comprises allocating the absolute probability value with each of the plurality of polygonal tiles in each hierarchical level in the hierarchical structure to create a probability map for the indoor space, and wherein the absolute probability value indicates whether the mobile device can be present in the polygonal tile, without any temporal context, instead of indicating the probability of the mobile device being present in the polygonal tile at any given instant, and wherein different absolute probability values are associated with different polygonal tiles based on a distance of the polygonal tile from the physical entity in another polygonal tile;

generate a grid map for the indoor space based on the probability map;

based on the probability map based grid map, perform calibration of the indoor space for generating a fingerprint map for the indoor space, the calibration comprising obtaining spatial data at known locations for each of the georeferenced polygonal tile in the various hierarchical levels in the grid; and providing, by the processor, indoor positioning services to mobile devices in the indoor space using the grid map, wherein the mobile devices are to perform localization based on corresponding spatial data in conjunction with the fingerprint map.

12. The server computing device of claim 11, wherein the absolute probability value associated with a polygonal tile increases as distance of the polygonal tile from a wall in the indoor space increases.

13. The server computing device of claim 11, wherein the absolute probability value is maximum for the polygonal tile located in a mid-region of a narrow path in the indoor space.

14. The server computing device of claim 11, wherein the absolute probability value is minimum for the polygonal tile located adjacent to a wall in the indoor space.

15. The server computing device of claim 11 further comprising instructions executable in the processor to;
georeferenced each of the physical entities in the indoor space; and
spatially index the grid with the physical entities in the indoor space to correlate a georeference of each physical entity with the polygonal tile from amongst the plurality of polygonal tiles at each hierarchical level.

16. The server computing device of claim 11, wherein the absolute probability value associated with the polygonal tile is based on a physical entity correlated to the polygonal tile, the correlation indicative of presence of the physical entity in that polygonal tile.

17. The server computing device of claim 11, wherein the physical entities comprise walls, passages, elevator shafts, escalators, open spaces, and doorways.

18. The server computing device of claim 11, wherein the plurality of polygonal tiles have a symmetrical hexagon shape.

19. The server computing device of claim 11, wherein the plurality of polygonal tiles have one of a same asymmetrical polygon shape and different symmetrical polygon shapes.

20. The server computing device of claim 11, wherein a first set of polygonal tiles in one hierarchical level in the hierarchical structure are symmetrical and of a first shape and a second set of polygonal tiles in another hierarchical level in the hierarchical structure are symmetrical and of a second shape, wherein a plurality of second set of polygonal tiles cover a single polygonal tile from the first set.

* * * * *